July 1, 1969 F. C. WELLINGTON ET AL 3,453,001
CUSTODIAL CART
Filed March 6, 1967
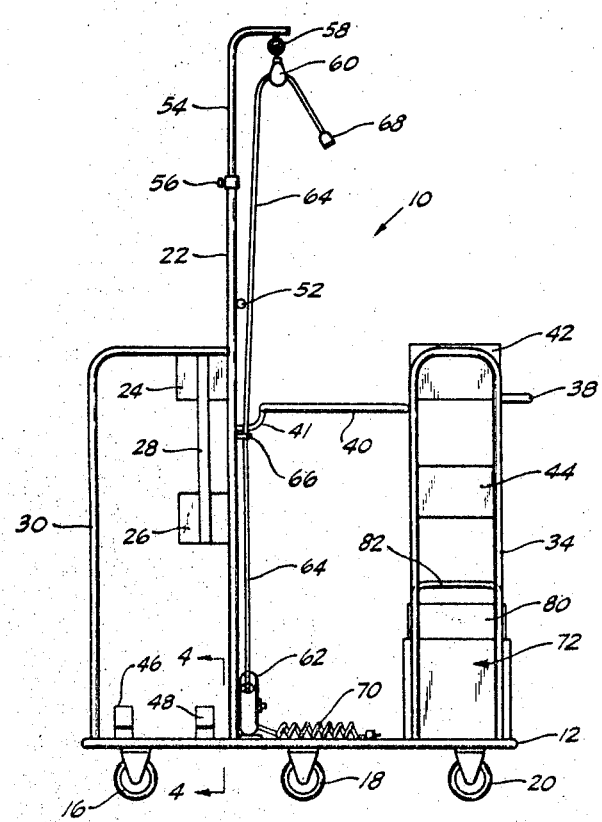
FIG-1
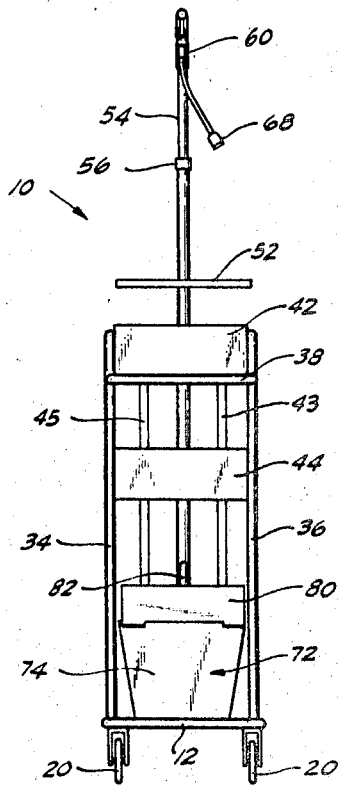
FIG-2
FIG-4
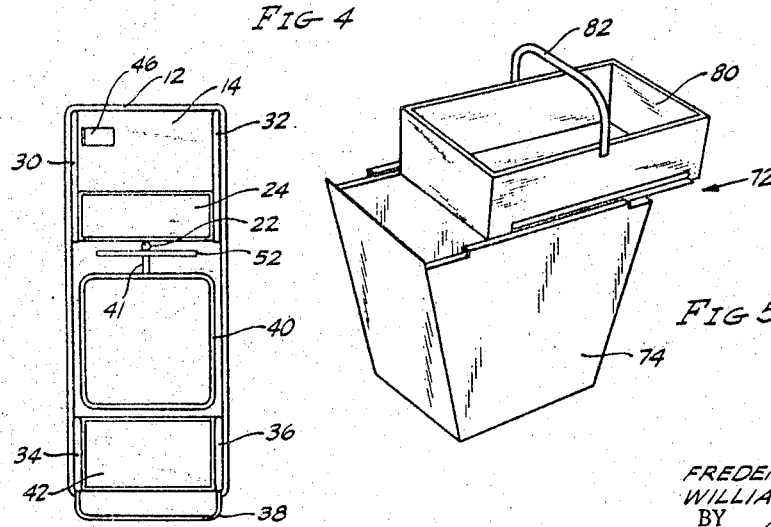
FIG-3
FIG 5
INVENTORS
FREDERICK C. WELLINGTON
WILLIAM G. CAVANAGH
BY
ATTORNEY United States Patent Office 3,453,001
Patented July 1, 1969

3,453,001
CUSTODIAL CART
Frederick C. Wellington, 5201 Kenwood, Buena Park, Calif. 90620, and William G. Cavanagh, 836 S. Burnside Ave., Los Angeles, Calif. 90036
Filed Mar. 6, 1967, Ser. No. 620,702
Int. Cl. B62b 3/12, 1/00
U.S. Cl. 280—47.35                    10 Claims

ABSTRACT OF THE DISCLOSURE

Custodial service of classrooms and other such rooms is aided by this custodial cart because it conveniently provides the necessary services, including portable units to be carried around the room for custodial maintenance of individual items and electric service to aid in vacuum cleaning. The electrical service includes an antenna mast with a spring woundup electric cord extending from the top of the mast so that it moves free of desks in the room and other obstacles.

Background

This invention is directed to a custodial cart which provides receptacles, containers and other services to aid in the custodial care of classrooms and similar spaces. The custodial cart provides receptacles which are retained on the cart and serve as holders for various custodial items. It also carries a portable custodial service unit for carrying custodial service aids and other equipment. Furthermore, the custodial cart of this invention supplies electricity to vacuum cleaners and the like through the use of a spring rewound power supply cord which extends from an antenna mast.

Prior structures for aiding custodial service are well known in the art. These prior devices are janitor's wagons which carry trash receptacles, brooms, buckets, vacuum cleaners, and other implements, as well as having racks for the smaller items required in custodial service. In view of the narrower aisles in today's classrooms, these prior janitor's wagons are not able to pass through the aisles and thus do not serve the required purpose. They simply serve as a janitor's center, and the janitor spends much time walking to and from his wagon, rather than carrying the necessities for custodial service with him. Furthermore, the supply of electric power is completely absent from the wagons of the prior art.

Summary

This invention is directed to a custodial cart, and particularly a custodial cart which is arranged for optimum convenience for custodial room service in school rooms and the like. The custodial cart includes an antenna mast from which an electrical power cord extends for using portable electrically powered custodial equipment within the room, such as vacuum cleaners. The power cord is spring rewound to maintain the cord above obstructions within the room and to take up on the cord to prevent tangling of the cord on the furniture within the room. Furthermore, the custodial cart has permanent fixtures and receptacles for the holding of various custodial equipment, such as brooms, large trash bags, cleaning equipment and supplies and the like. Also, a portable custodial unit is detachably carried upon the cart.

The advantages of this custodial cart are thus to provide electrical service which does not tangle with room furniture and provide services both on the custodial cart and on the portable custodial unit for room custodial services. By this means the custodial cart of this invention stands sufficiently close to supply the various needs within the room, and the portable unit is carried along to aid in the custodial care of individual units around the room. This solves the problems of the prior art with respect to cord tangling, and the fact that prior structures have not been able to supply these various needs for most efficient and most convenient adequate custodial care.

Accordingly, it is an object of this invention to provide a custodial cart which supplies electric power to the point of need within the room, and to maintain the electric power supply cord above the normal furniture obstructions in the room. It is another object of this invention to provide a custodial cart which is arranged to carry all of the custodial needs, and to provide cart structure which retains the custodial equipment and supplies upon the cart. Other objects and advantages of this invention will become apparent from a study of the following portion of this specification, the claims, and the attached drawings.

Description of the drawings

FIG. 1 is a side elevational view of the custodial cart of this invention.

FIG. 2 is an end elevational view thereof.

FIG. 3 is a top plan view thereof.

FIG. 4 is a partial section taken generally along the line 4—4 of FIG. 1.

FIG. 5 is an isometric view of the separable custodial unit removed from the custodial cart.

Description

The custodial cart of this invention is generally indicated at 10. The custodial cart 10 is primarily built of bent tubing. The base 12 comprises a substantially rectangular structure built of bent tubing, with floor 14 extending from one side to the other. Support wheels 16, 18 and 20 are arranged in pairs beneath base 12 to support the structure and permit the cart 10 to be propelled to the place where it is needed. Preferably, pairs of wheels 16 and 20 are casters. Uprights extend upward from the floor. These uprights perform various supporting functions.

Upright 22 is an antenna mast which extends upward from floor 14, preferably midway between the side edges. Secured to mast 22 are receptacles 24 and 26. Both receptacles 24 and 26 have open tops and closed sides and bottoms. They are joined to each other by means of side straps 28, one of said side straps being positioned on each end of the receptacles. Side bars 30 and 32 extend upward from base 12 at the sides thereof and extend backward to be secured to receptacle 24 at the top ends thereof. The side bars 30 and 32 leave an opening at the front of cart 10, but form side supports at the sides of this space defined by the side bars. Thus, mast 22 is additionally supported by means of the side bars.

The rear end of custodial cart 10, as seen at the right of FIG. 1 and as seen in elevation in FIG. 2, has an upstanding, inverted U-shaped support bar on each side thereof. Support bar 34 and support bar 36 extend upward from the sides of base 12 adjacent the front end of the base. At the top, support bars 34 and 36 are secured to each other by handle 38. In the center space of custodial cart 10, between support bars 34 and 36 and mast 22, ring 40 is secured to the mast by bracket 41 and is secured to support straps 43 and 45 which rest on floor 14 and are attached to receptacle 44. Receptacles 42 and 44 are preferably fixed between support bars 34 and 36. Receptacles 42 and 44 each have closed bottoms and sides, and open tops. Thus, together with receptacles 24 and 26 they are adapted to carry custodial equipment and supplies.

As is seen in FIG. 1 and FIG. 4, brackets 46 and 48 are secured to floor 14 and extend to the inner edge of base 12. The brackets have upwardly directed hooks 50 so they are adapted to carry push brooms, dust mops, and the like. As an additional feature, mast 22 carries bar 52 which can serve as a support for a roll of paper towels and the like. The front end of custodial cart 10, between side bars 30 and 32 has adequate space for the placement of a vacuum cleaner thereof. Furthermore, receptacles 24 and 26 can carry vacuum cleaner attachments or other supplies, and brackets 46 and 48 can carry a dust mop or push broom for the cleaning of floors which are not carpeted. Furthermore, ring 40 carries a large bag (not shown) hanging down therein for the reception of trash. Receptacles 42 and 44 can carry window, chalkboard, or desk cleaning supplies or the like. Thus, all of the needed maintenance equipment can be brought to the doorway or into the doorway of a room.

In order to conveniently supply electric power to the vacuum cleaner or other electric equipment as it is used through the room, mast 22 extends upwardly and has telescoped in the top thereof upper mast or antenna 54. Adjustable lock 56 permits the upper mast 54 to be raised telescopically to the maximum height, and still when lowered pass through a doorway. The upper end of upper mast 54 carries ring 58 to which is detachably secured pulley 60. Mounted upon floor 14 is electric cord windup reel 62. Reel 62 has an electric cord 64 extending therefrom. Cord 64 passes through guide 66 and pulley 60 to terminate in plug 68. The windup tension of reel 62 is sufficient to rewind cord 64 and to maintain a tension upon cord 64. Thus, when a vacuum cleaner is plugged into plug 68, and the vacuum cleaner is moved about the room, the vacuum cleaner cord and cord 64 are suspended by the cord tension so that they do not tangle on furniture. As the vacuum cleaner moves from and to the custodial cart, cord 64 is unwound and rewound as is necessary. so there is no tangling problem. Cord 64 can also pass through mast 22 and mast 54 if the masts are hollow, thus eliminating cord guides. Coiled cord 70 is electrically connected to cord 64, and is plugged into an adjacent receptacle to supply power to plug 68 and thus to the vacuum cleaner or other electrical appliance. Thus, custodial cart 10 can be brought into a room, just inside the doorway and supply the vacuum power means to the entire room and serve as a custodial maintenance center. Detachably secured pulley 60 can be detached from ring 58 and attached to a similar ring at the top of the doorway or other elevated locations in the room to be cleaned. Then pulley 60 serves in the same manner with cord 64 as when detachably secured pulley 60 is attached to ring 58.

In order to aid custodial care of the room, and provide convenient transportation of small custodial equipment and supplies, custodial unit 72 is provided. Custodial unit 72 is carried between support bars 34 and 36, on floor 14 and below receptacle 44, as is shown in FIGS. 1 and 2. FIG. 5 shows a separate and more detailed view of custodial unit 72. Custodial unit 72 includes basket 74 which has closed sides and bottom, and an open top. Sides 76 and 78 have guides at the top edge. Receptacle 80 has a carrying handle 82. Tracks on the receptacle engage in the guides on the sides so that receptacle 80 may be slid off the top of basket 74, as shown. However, when receptacle 80 is slid into place, it engages against the upward extending portion of the end of basket 74. Thus, basket 74 can be picked up by raising receptacle 80 by handle 82. With the indicated construction of hand custodial unit 72, custodial unit 72 can be picked up from its space between support bars 34 and 26 and carried around the room.

In use, custodial cart 10 is moved to the doorway of the room. The door is unlocked, opened, and door surfaces cleaned, then the lights are turned on in the room. If the door still so permits, custodial cart 10 is moved inside the room, just inside the doorway so that it is in the most convenient location. Custodial cart 10 is plugged into a nearby receptacle by means of coiled cord 70. Next, custodial unit 72 is removed from the cart and the custodian carries this around the room as he performs the services around the periphery of the room. Floor service and the services around the center of the room are next to be performed. If the room is carpeted, a vacuum cleaner is removed from custodial cart 10 where it was resting between side bars 30 and 32. Since the front of the cart is open, the vacuum cleaner may be readily removed. Preferably the vacuum cleaner is already plugged into plug 68 so that it is ready for immediate use. As the vacuum cleaner is moved around the room, the tension of cord 64 and the height of pulley 60 keeps the cord from tangling on desks and chairs within the room. Thus, vacuuming can proceed through the entire room. During this floor maintenance tour, or if desired immediately before, the desk tops and other items of furniture within the room away from its periphery can be cared for by cleaning the top or the like. When the services in the center of the room are completed, the vacuum cleaner is returned to its place upon custodial cart 10 and cord 64 is automatically rewound as the cleaner is returned to its place. If there are any noncarpeted floor areas, a dust mop or push broom can be carried upon the side of the custodial cart upon brackets 46 and 48 or elsewhere on cart 10. Thus, the noncarpeted floor area cleaning equipment is also readily available. The order in which the steps of use of the custodial cart are performed is not critical, and the room cleaning can thus be done in any sequence.

This invention having been described in its preferred embodiment, it is clear that it is susceptible to numerous modifications and embodiments within the ability of the routine artisan and without the exercise of the inventive faculty.

Accordingly the scope of this invention is defined by the scope of the following claims.

We claim:

1. A custodial cart comprising:
   a tubular, substantially rectangular base, said base being provided with a floor and with supporting wheels beneath said base,
   a mast extending upwardly from said floor, the top of said mast being provided with a pulley,
   an electric cord,
   a reel attached to said cart adjacent the lower end of said mast, said reel being to retractably retaining said electric cord, one end of said electric cord extending from said reel upwardly along said mast and around said pulley, said one end having a plug means for attachment to an electrical appliance, and
   a second cord, having a first end electrically attached to the other end of said electric cord adjacent said reel, and a second end, said second end having plug means to be plugged into a source of electricity, thereby supplying power via said electric cord to said appliance.

2. The custodial cart of claim 1 further comprising:
   a receptacle having a bottom and sides, said receptacle being attached to said mast, and
   a pair of substantially inverted L-shaped tubular members, one end of each member being attached adjacent one end of said base, the other end being attached to a side of said receptacle.

3. The custodial cart of claim 2 further comprising:
   a pair of substantially inverted U-shaped tubular support bars extending upwardly in spaced parallel relationship from the other end of said base,
   at least one receptacle having a bottom and sides mounted between said support bars, and
   a horizontal hoop suspended between said mast and said support bars.

4. The custodial cart of claim 1 wherein said mast is tubular and said one end of said electric cord extends through said mast.

5. The custodial cart of claim 2 wherein said tubular members define a space for the storage of a vacuum cleaner on said cart, said vacuum cleaner being connectable to said one end of said electric cord, and wherein said cart is adapted to be positioned at a stationary location and to supply power via said electric cord to said vacuum cleaner as said vacuum cleaner is moved from place to place.

6. The custodial cart of claim 1 further comprising: a portable custodial unit carried on said custodial cart, said portable custodial unit comprising a basket having closed ends, sides and bottom, and an open top, a receptacle detachably mounted to the top of said basket, said receptacle closing the top of said basket when said receptacle is in position on top of said basket, handle means on said receptacle, said handle means permitting said receptacle and said basket to be raised together when said receptacle is attached to said basket, so that said portable custodial unit can be removed from said cart and can be used for custodial servicing independent of said cart.

7. The custodial cart of claim 2 wherein said mast is telescopically adjustably extensible so that the height of said electric cord above said base of said custodial cart is selectable.

8. The custodial cart of claim 2 wherein said reel comprises a windup reel with said electric cord wound upon said windup reel being spring stressed in the windup direction.

9. The custodial cart of claim 8 wherein said pulley is detachable from said mast so that said pulley can be removed from said mast and can be attached to another elevated location.

10. The custodial cart of claim 9 wherein a cord guide is positioned on said mast intermediate the ends thereof and said electric cord passes through said cord guide intermediate said cord windup reel and said pulley.

References Cited

UNITED STATES PATENTS

| | | | |
|---|---|---|---|
| 1,430,550 | 10/1922 | Hotalino et al. | 191—12.4 X |
| 1,746,134 | 2/1930 | Thompson | 280—79.2 |
| 2,116,312 | 5/1938 | Hollett | 280—50 |
| 2,317,843 | 4/1943 | Backlund | 15—50 |
| 2,386,489 | 10/1945 | McKellar | 15—257 |
| 3,162,462 | 12/1964 | Elders | 280—47.35 |
| 3,213,185 | 10/1965 | Petrick | 174—58 |

LEO FRIAGLIA, *Primary Examiner.*

JOEL E. SPIEGEL, *Assistant Examiner.*

U.S. Cl. X.R.

280—79.2